United States Patent [19]

Tuchenhagen et al.

[11] 4,436,106

[45] Mar. 13, 1984

[54] PIPELINE SWITCH WITH LEAKAGE CONTROL AND CLEANABLE LEAKAGE CAVITY

[75] Inventors: Otto A. P. Tuchenhagen, Lüchow-Dannenberg; Hans O. E. Mieth, Hamburg; Herbert R. Coura, Lüchow-Dannenberg, all of Fed. Rep. of Germany

[73] Assignee: Otto Tuchenhagen GmbH & Co. KG, Fed. Rep. of Germany

[21] Appl. No.: 199,662

[22] Filed: Oct. 22, 1980

Related U.S. Application Data

[62] Division of Ser. No. 873,068, Jan. 27, 1978, Pat. No. 4,344,453.

[30] Foreign Application Priority Data

Jan. 29, 1977 [DE] Fed. Rep. of Germany ....... 2703792
Nov. 14, 1977 [DE] Fed. Rep. of Germany ....... 2750833

[51] Int. Cl.$^3$ .............................................. F16K 1/44
[52] U.S. Cl. .................................... 137/240; 137/312; 137/614.11; 137/630.22
[58] Field of Search .............. 137/240, 614.11, 614.18, 137/614.17, 614.19, 312, 630.22

[56] References Cited

U.S. PATENT DOCUMENTS

| | | | |
|---|---|---|---|
| 1,724,017 | 8/1929 | Godfrey | 137/312 |
| 3,517,688 | 6/1970 | Scholle | 137/240 |
| 3,643,679 | 2/1972 | Hansson | 137/241 |

FOREIGN PATENT DOCUMENTS

| | | | |
|---|---|---|---|
| 1058802 | 11/1959 | Fed. Rep. of Germany . | |
| 2027792 | 1/1971 | Fed. Rep. of Germany . | |
| 2432967 | 6/1975 | Fed. Rep. of Germany . | |
| 2532838 | 1/1977 | Fed. Rep. of Germany . | |
| 2609791 | 9/1977 | Fed. Rep. of Germany | 137/240 |
| 2623301 | 12/1977 | Fed. Rep. of Germany | 137/240 |
| 50-29530 | 4/1975 | Japan . | |
| 702442 | 1/1954 | United Kingdom . | |
| 1430488 | 3/1976 | United Kingdom . | |

*Primary Examiner*—A. Michael Chambers
*Attorney, Agent, or Firm*—Stevens, Davis, Miller & Mosher

[57] ABSTRACT

Apparatus for cleaning a liquid connection and securing a stroke and spring abutment for double seat pipeline switches with leakage control, comprising a pipeline switch housing, a pipeline switch drive mounted within the switch housing, two valve disks of different sizes, two concentrically mounted valve rods of different lengths, one of the valve rods being hollow, the one of longer length fitting within the other of shorter length, the inside valve rod being connected to the pipeline switch drive and the smaller of the two valve disks, the inside valve rod upon being lifted by the drive carrying along the valve disk of larger size, the valve disks in both the closed position and the open position enclosing between themselves a leakage cavity, one end of the hollow valve rod defining a pressing and guide part with a spring abutment and a connecting opening adapted to receive a cleaning fluid, a rod head forming a portion of the longer valve rod and defining a connecting opening, an upper spring abutment and an upper stop surface for the pressure and guide part, and a spring between the rod head and the pressing and guide part to bias them apart, the valve rod of longer length defining an axial bore with transverse holes communicating with the leakage cavity and the connecting opening in the valve head, the pressing and guide part communicating around the valve rod of longer length and through the leakage cavity with the axial bore and connecting opening of the valve head to provide a fluid passageway for the cleaning fluid through the apparatus.

6 Claims, 4 Drawing Figures

PIPELINE SWITCH WITH LEAKAGE CONTROL AND CLEANABLE LEAKAGE CAVITY

This is a division of application Ser. No. 873,068 filed Jan. 27, 1978, now U.S. Pat. No. 4,344,453 issued Aug. 17, 1982.

It is known to develop pipeline switches, particularly for the foodstuff industry, as double-seat pipeline switches which have two valve disks which to a limited extent are independent of each other and movable relative to each other. One valve disk is rigidly connected with the drive for the pipeline switch and positively carries the other valve disk along with it in its stroke. The valve rods or valve disks point in one direction while telescopically into each other, and the valve disks, both in their closed and in their open position form between themselves a leakage cavity which, within moving structural parts which are not connected with the pipeline switch housing, has in special cases one connecting path, but as a rule two connecting paths to the surroundings of the pipeline switch. The path or paths serve both for leading away of the leakage liquid and for the feeding or discharge of the fluids required for the cleaning process.

The known pipeline switches of the type characterized above employ the, preferably cylindrical, connecting rod between the drive and the positively driven valve disk. The connecting rod act as a supporting and guiding element for the non-driven valve disk which concentrically surrounds the connecting rod by an extension which is developed as a hollow rod. This solution has the severe drawback that in an installed condition the bearing annular clearance which is formed between the connecting rod and the guided extension of the non-driven valve disk is sealed off from the leakage cavity between the valve disks and is accessible only inadequately if at all for cleaning.

It furthermore is disadvantageous for many uses that the known pipeline switches introduce the drive energies for the valve disks as well as all connecting conduits to the leakage cavity which are necessary for the discharge and indication of leakage liquid and for the feeding and discharge of fluids determined by the cleaning from two oppositely located sides into the pipeline switch housing.

The object of the invention is to create a pipeline switch with leakage control, with a leakage cavity which is accessible for cleaning when installed, in which the bearing annular clearance between the connecting rod and the hollow rod in an installed condition can be cleaned completely in every position of the pipeline switch.

One embodiment of the invention is intended to make it possible for both the drive energies for the valve disks as well as all connecting conduits to the leakage cavity which are necessary for the removal and indication of leakage liquid and for the feeding and removal of fluids determined by the cleaning, to be introduced into the pipeline switch housing from one side.

This purpose is achieved in accordance with the invention in the manner that the bearing annular clearance is, in its entire length, an integral part of a connecting path between leakage cavity and the surroundings of the pipeline switch.

The invention furthermore has the object of further developing the apparatus in accordance with West German Provisional Patent No. 26 32 587 in such a manner that a spring is also included in the automatic process of cleaning the leakage cavity and that furthermore a separation of the structural parts surrounding the spring from the hollow rod is possible for simpler assembly and disassembly. This object is achieved in accordance with the invention in the manner that the housing part which receives the upper spring abutment, the upper stop surface, and the connecting opening for cleaning liquid forms, in combination with the pressing and guide part, the spring chamber within which the spring is arranged tightly sealed off from the atmosphere.

The advantages obtainable with the invention can be noted from the objects indicated. In particular, the introduction of the cleaning liquid through the bearing annular clearance between the valve rods, as compared with possible other arrangements of the cleaning inlet and of the sealing of said gap by the slide seal or membrane at the entrance into the leakage cavity, is the most reliable method of assuring sanitary or chemically and mechanically clean conditions at this place. Advantageous embodiments of the invention are described in the subordinate claims.

With one embodiment of the pipeline switch of the type indicated above, the result is obtained when both the drive energies for the valve disks and all connecting conduits to the leakage cavity necessary for the leading away and indication of leakage liquid and for the feeding and discharge of fluids determined by cleaning are introduced from one side into the pipeline switch housing.

By the solution proposed, new possibilities are opened up for the use of pipeline switches of the type indicated above and additional structural measures which were heretofore at times necessary for the use of the known pipeline switches are substantially avoided.

Thus the known pipeline switches cannot be used, or can be used only as a result of special additional structural measures, in cases of use in which, for reasons of arrangement, the second side traversed by connecting conduits is not available. This case is present, for instance, when the second side of the pipeline switch is to be arranged at a minimum structural distance from a solid wall or if a pipeline switch is arranged (for instance as a corner valve) directly on a container and the discharge pipe serving for the leading away of the leakage and cleaning liquids would extend into the container.

In one development, the annular clearance between the rods which serve for the drive of the valve disks and are guided concentrically in each other forms one connecting path, and the hollow-bore valve rod, connected with the valve disk furthest away from the pipeline switch drive forms the other connecting path between the leakage cavity and surroundings of the pipeline switch housing. In the present invention the two basic possibilities of connection with respect to indication and removal of leakage liquid and feeding and removal of fluids determined by cleaning are set forth. The specific use determines the proposed variant which is selected. As a rule the cleaning fluids are fed through the hollow-drilled, inner valve rod. The discharge of these fluids and the removal of the leakage liquid is served by the annular clearance lying on the outside.

If no special requirements are made as to compact construction and if height-saving requirements are not relevant, a connecting path can be arranged between the leakage cavity and the surroundings of the pipeline switch—preferably that serving for the discharge of the fluids and the leading away of the leakage liquid—in an extension of the valve stem which is brought out on the side of the pipeline switch housing facing away from the pipeline switch drive. The cleaning fluid is in this connection introduced, in controlled manner, via a feed pipe, which is connected directly with the bearing annular clearance outside of the pipeline-switch housing part facing the drive. into the bearing annular clearance and washes same completely.

In another embodiment, a valve stem borehole, is provided within the valve rod and branches out, with due consideration of the relative movement of the two valve disks with respect to each other at the maximum opening stroke of the smaller valve disk at the upper end of the bearing annular clearance, into distribution boreholes and connects the feed pipe with the bearing annular clearance. The feeding of the cleaning fluid to the valve stem borehole can be effected via the feed pipe extended to the valve rod alternately either from the side of the pipeline switch drive or from the opposite side. By this embodiment an extremely compact block arrangement of a plurality of pipeline switches is solved without any problem.

With further developments in the which the hollow-bore inner valve rod is dispensed with, structural simplifications are obtained. In this so-called economical variant, the second connecting path between the leakage cavity and the surroundings of the pipeline switch housing is dispensed with. The possibility of use of the pipeline switch is limited only insofar as cleaning of the leakage cavity being no longer possible in the closed position of both valve disks.

In another embodiment of the pipeline switch, the annular clearance between the two rods driving the valve disks is the removal line for leakage liquid and/or for fluids determined by the cleaning method out of the leakage cavity.

In a further embodiment of the pipeline switch, the cleaning of the leakage cavity from the part of the housing facing the pipeline-switch drive is possible in the closed position of the smaller valve disk by the lifting of the larger valve disk.

If the leakage cavity is to be cleaned from the other housing part, then a connection is created between the corresponding housing part and the leakage cavity in the closed position of the larger valve disk by lifting the smaller valve disk from its seat.

Another development of the pipeline switch required a second drive which operates independently of the pipeline-switch drive. This second drive can be dispensed with. In such case, the pipeline switch drive, for the cleaning of the leakage cavity, takes over the lifting of the smaller valve disk, assurance being provided by a lift limiter that the smaller valve disk does not come to rest on the larger value disk and thus close off the cleaning path.

In another embodiment of the pipeline switch, assurance is had, by the stroke limitation provided there, that the valve disk which has been moved does not also lift the one which remains in the closed position from its seat.

In another embodiment of the pipeline switch, cleaning of the leakage cavity is possible both in the closed position and in any desired open position of the pipeline switch. This result is achieved in the manner that the lift devices, which are connected respectively with the rods driving the valve disks, are moved relatively towards each other by a second drive. In this way an annular clearance is freed between the valve disks.

In another advantageous embodiment of the pipeline switch in which the bearing annular clearance serves for the feeding of the fluids determined by the cleaning method, an elastic baffle body (not illustrated) is arranged at the inlet of the bearing annular clearance into the leakage cavity. This elastic baffle body by its development and arrangement performs substantially the following functions:

Sealing of the bearing annular clearance against the penetration of leakage fluid;

Introduction of the fluids established by the cleaning method into the leakage cavity with so much resistance that the bearing annular clearance is completely filled and flushed;

Guiding of the incoming cleaning liquid by the sealing lip of the baffle body, which, upon lifting from its sealing seat on the upper valve disk, forms a clearance in the shape of an annular nozzle, onto the inner surfaces to be cleaned of the leakage cavity.

One embodiment of the apparatus in accordance with the invention is advantageously developed in the manner that the connecting opening for cleaning liquid discharges tangentially into the annular spring chamber. By this measure and by development of the housing part which extends into the interior of the spring as a displacement part, optimum flow conditions for the automatic cleaning are created. The displacement part is in this connection advisedly extended downward so far in the direction of the pressure and guide part that its end surface forms the upper stop surface for the securing of the stroke.

In another embodiment, the pitch of the spring is so selected that the direction sectors of the horizontal component of the spring pitch and of the axis of closure opening which is directed tangentially from the outside towards the inside are the same. This arrangement has the result that the spring turns, to a limited extent, transport cleaning liquid into the uppermost region of the spring chamber lying opposite the connecting opening so that in this way the critical region can be suitably cleaned.

Insofar as it does not appear structurally possible or advisable from a material standpoint of manufacture the pressing and guide part and the housing part of a pair of materials which experience shows have sufficient sliding properties and therefore do not tend to "seize", then, in accordance with another embodiment a slide and guide part embedded in a bearing groove, takes over the guiding between housing and pressing and guide parts.

In another embodiment, the pressing and guide part is connected with the hollow bar merely in form-sliding manner by placing its receiving bore over the hollow rod. One essential advantage is the simple assembling and disassembling of the pipeline switch in addition to the simplification of manufacture.

The invention will be explained below, by way of example, with reference to the drawing.

Figure 1:
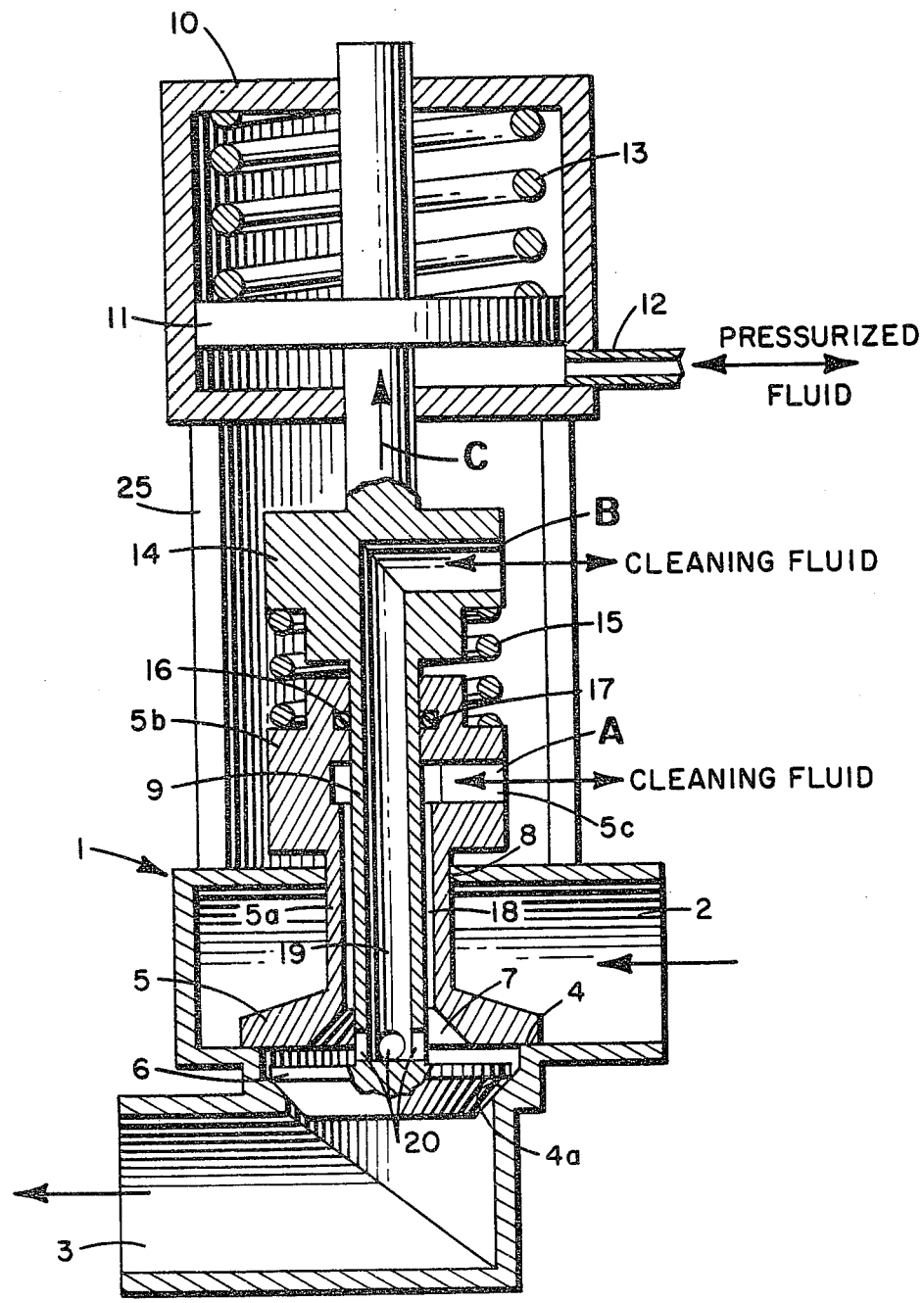
FIG. 1 is a cross section through an embodiment of a pipeline switch in accordance with the invention having two connecting paths between leakage cavity and surroundings of the pipeline switch housing.

Within the pipeline switch housing 1 having the pipeline switch housing parts 2 and 3 there are located the independently and the dependently driven smaller and larger valve disks 6 and 5 respectively (FIG. 1). The independently driven smaller valve disk 6 rests on the smaller seat 4a and is connected via the valve rod 9 and the rod head 14 with the pipeline switch drive 10 to 13 which is secured to cross member 25; and consists of the drive housing 10, the piston 11, the working-fluid connection 12, and the drive spring 13. The larger valve disk 5 which is driven as a function of the smaller valve disk 6 lies on the larger seat 4 and rests via the hollow rod 5a and the connecting piece 5b against the rod head 14 by means of a spring 15 which exerts prestressing forces both in the open position and in the closed position of the pipeline switch. The valve rod 9 is guided concentrically in the hollow rod 5a and forms with the latter the bearing annular clearance 18 which connects the leakage cavity 7 formed by the valve disks 5, 6 with the connecting opening 5c arranged in the connecting piece 5b. A second connecting path between the surroundings of the pipeline switch and the leakage cavity 7 is established by the valve rod bore 19 arranged in the valve rod 9 and discharging via openings 20 into the leakage cavity 7. The hollow rod 5a is supported and sealed on the one hand via the bearing and sealing opening 8 in the pipeline switch housing 1 while, on the other hand, a sealing is effected between the hollow rod 5a and the valve rod 9 via the groove 16 with its packing ring 17. The pipeline switch is shown in a closed position.

If the pipeline switch is actuated, operating fluid, for instance compressed air, enters into the working fluid connection 12 and into the drive housing 10, and the piston 11 via the valve rod 9 lifts the smaller valve disk 6 from the smaller seat 4a and a switch leakage passes from the pipeline switch housing part 3 into the leakage cavity 7 until the smaller valve disk 6 comes against the larger valve disk 5 and is sealed against the latter by the continuing action of the spring 15. Upon the further upward movement, the larger valve disk 5 is also lifted from the larger seat 4 so that the connection between pipeline switch housing parts 2 and 3 is brought about. The spring 15 sees to the blocking off of the leakage cavity 7 from the fluid within the pipeline switch housing parts 2 and 3 also in the open position of the pipeline switch.

The closing process of the pipeline switch is effected in similar manner, in reverse sequence to the opening which has been described, during the discharge of the working fluid out of the drive housing 10. In this case also a switch leakage passes from the pipeline switch housing part 3 into the leakage cavity 7 when the larger valve disk 5 has reached the larger seat 4 and the smaller valve disk 6 is on the path from the position of rest against the larger valve disk 5 to the smaller seat 4a. The bearing annular clearance 18 in combination with the connecting opening 5c feeds the fluids determined by the cleaning process (hereinafter called the cleaning fluids) via the connection A to the leakage cavity 7, while the valve-rod bore 19 which discharges into openings 20 serves, via the connection B on the one hand for the discharge of the fluid and on the other hand for the leading away of the leakage liquid. If the valve rod 9 is raised, with the larger valve disk 5 engaging the seat 4, in the direction C, then the smaller valve disk 6, upon the further course of the movement, comes against the larger valve disk 5 and brings the latter also into the open position. In this open position, a cleaning or a leading away of leakage liquid is similarly established in the manner already indicated above.

The valve rod bore 19 which discharges into openings 20 leads, in another manner of operation, the fluids determined by the cleaning process to the leakage cavity 7 via the connection B, while the bearing annular clearance 18 in combination with the connecting opening 5c, leads away these fluids and the leakage liquid via the connection A.

Figure 2:
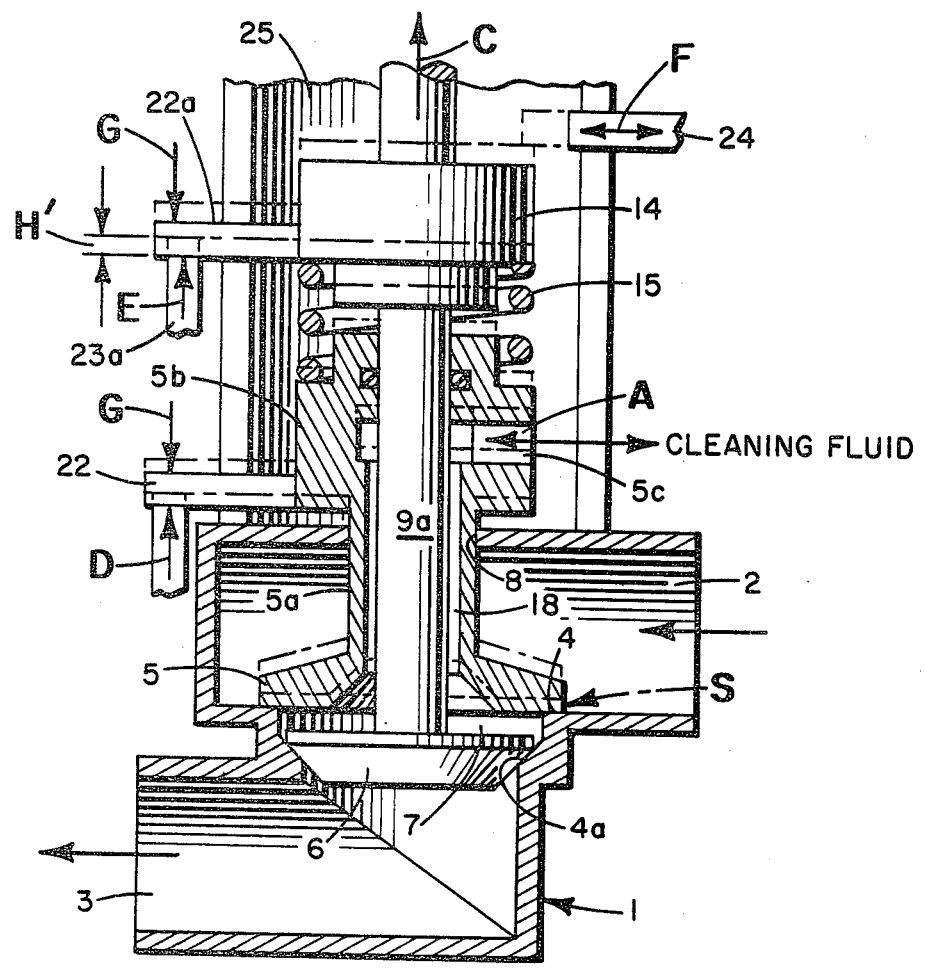
FIG. 2 shows a cross section through a modified embodiment of a pipeline switch in accordance with the invention with one connecting path.

The pipeline switch shown in FIG. 2 has a connecting path between its surroundings and the leakage cavity 7. The second connecting path 19 arranged within the valve rod 9 in FIG. 1 is dispensed with. Valve rod 9a is a solid rod in FIG. 2. Both in the closed position and in the open position of the pipeline switch the annular clearance 18, in combination with the connecting opening 5c and the connection A, forms the removal line for leakage liquid and/or for fluids determined by the cleaning process out of the leakage cavity 7. The leading away of the leakage liquid from the leakage cavity 7 in the closed position of the pipeline switch is shown in solid lines in FIG. 2, and the open position for the leading away of the fluids determined by the cleaning method is shown in phantom (dot-dash) lines.

The rest of the construction of the pipeline switch of FIG. 2 corresponds to that of FIG. 1, except for the features indicated below. The cleaning of the leakage cavity 7 in combination with the seat 4 is made possible in the manner that, in the closed position of the smaller valve disk 6, the larger valve disk 5 is raised by a lifting device 22 which is actuatable independently of the pipeline switch drive via a second drive (not shown), said lift device being connected at a suitable place outside the pipeline switch housing 1 with the hollow rod 5a or the connecting piece 5b, so that an annular clearance S is freed. The cleaning fluids enter the leakage cavity 7 at the annular clearance S and emerge at the connection A (right-hand half of FIG. 2).

Figure 2A:
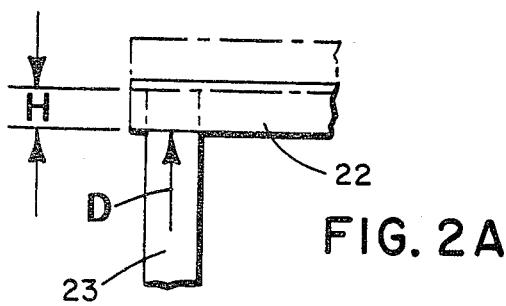
FIG. 2A shows a detail of a tappet for a pipeline switch in accordance with FIG. 2.

The force D acting on the lifting device 22 and which is transmitted in the embodiment shown by way of example for instance by a tappet 23 in FIG. 2A, rests, as force of reaction, on a place on the pipeline switch housing 1 which is established by the structural arrangement of the tappet drive and not described further here. In order definitely to exclude a lifting of the smaller valve disk 6 from the smaller seat 4a by the tappet 23, the tappet 23 is provided with a limited stroke H (FIG. 2A). The tappet 23 can only be active, i.e. it can only actuate the lift device 22, as long as the larger valve disk 5 forms with the larger seat 4 an annular clearance S which is smaller in axial length than is necessary for optimal cleaning and is to be realized by the stroke H of the tappet 23. In other words, the stroke H is the maximum distance tappet 23 can move arm 22.

With the development of the pipeline switch it is possible to clean the leakage cavity 7 from the pipeline switch housing part 3. For this purpose, the smaller valve disk 6 must be lifted from the smaller seat 4a, while the larger valve disk 5 remains in its closed position. The drive force E is supplied by a second drive which operates independently of the pipeline switch drive and strikes, for instance, via a tappet 23a the lifting device 22a which is connected outside of the pipeline switch housing 1 with the valve rod 9a or the rod head 14. The force E which acts on the lifting device 22a rests, as force of reaction, on the pipeline switch housing 1. In order to be certain of preventing a lifting of the larger valve disk 5 from the larger seat 4a by the tappet 23a, the tappet 23a is provided with a limited stroke H' (FIG. 2). Tappet 23a can only be active, i.e. actuate the lifting device 22a when and only when the smaller valve disk 6 is at a distance from the larger valve disk 5 which is greater than the necessary safety distance. The maintaining of the safety distance assures the desired remaining of the larger valve disk 5 in its closed position. In other words, the limited stroke H' is not large enough to lift valve 6 high enough to close annular opening 18.

The second drive, not shown in detail, can be dispensed with if the lifting of the smaller valve disk 6 is effected by actuation of the valve rod 9 in direction C by the pipeline switch drive (10 to 13) (see FIG. 1). A lift limiter 24 which is controllable in the directions F, limits the lifting motion in the direction C so that assurance is had that the smaller valve disk 6 does not come against the large valve disk 5 and thus close the cleaning path (5 and 18) to the leakage cavity 7.

A cleaning of the leakage cavity 7 both in the closed position and any open position of the pipeline switch is possible by a second drive which is independent of the pipeline switch drive. This second drive exerts in this connection forces G on the lift devices 22, 22a which are able to press the rod head 14 under all operating conditions against the connection piece 5b so that an annular clearance is produced between the valve disks 5, 6.

Figure 3:
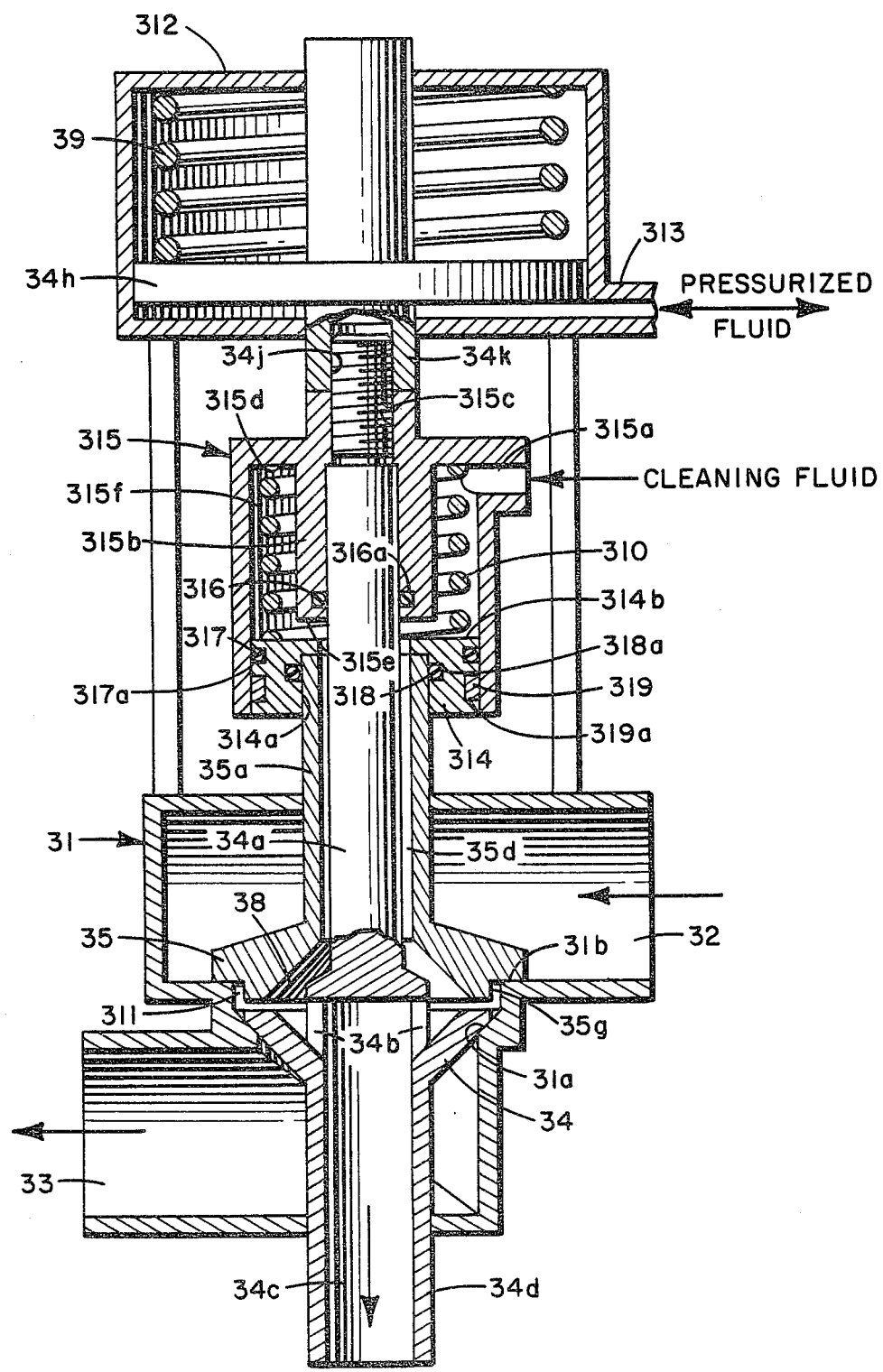
FIG. 3 shows a cross section through another embodiment of a pipeline switch in accordance with the invention.

The double-seat pipeline switch of FIG. 3 consists accordingly of the pipeline switch housing 31, the pipeline switch housing parts 32 and 33, the smaller and larger seats 31a and 31b, the smaller and larger valve disks 34 and 35, the valve rod and hollow rod 34a and 35a, the openings 34b, the outlet bore 34c the pipe 34d, and the piston 34h, the annular clearance 35d and the cylindrical shoulder 35g, the leakage cavity 38, the drive spring 39, the spring 310, the disk annular clearance 311, the drive housing 312, and the working-fluid connection 313.

The apparatus claimed consists of the pressing and guide part 314 and the housing part 315 which together form the spring chamber 315f. The housing part 315 defines the connecting opening 315a for the cleaning liquid and which is tangential to the inner wall chamber 315f, the upper spring abutment 315d and, at the end of its displacement part 315b which extends into the spring 310 and the upper stop surface 315e. The sealing of the housing part 315 from the valve rod 34a takes place via the valve rod packing 316 in the packing receiver 316a. Housing part 315's attachment to the valve rod 34a is effected for example by screwing threaded fastening bore 315c onto the fastening part 34a which in turn is connected via the threaded journal bore 34j in the drive journal 34k with the drive system 34h, 39, 312, 313. The pressing and guide part 314 is connected in form-fitting manner with the hollow rod 35a by placing its receiving bore 314a over said hollow rod. The pressing and guide part 314 forms by its seat facing the spring 310 the lower stop surface and spring abutment 314b and is guided in the housing part 315 via the slide and guide part 319 embedded in the bearing groove 319a. Its sealing from the housing part 315 takes place on the one hand by the housing packing 317 in the packing receiver 317a and with respect to the hollow rod 35a on the other hand by the hollow rod packing 318 in the packing receiver 318a.

At the start of the opening movement and at the end of the closing movement of the double-seat pipeline switch a relative movement takes place between hollow rod 35a and valve rod 34a. This relative movement takes place between the housing and pressing and guide parts 315 and 314 respectively and not, for instance, in the receiving bore 314a between hollow rod 35a and the pressing and guide part 314. By the tangential alignment of the axis of the connecting opening 315a the cleaning fluid flows via the connecting opening 315a into the annular spring chamber 315f which is constricted by the displacement part 315b with a swirling movement, thereby decisively improving the cleaning action. If the pitch of the spring 310 is so selected that the directional vectors of the horizontal component of the spring pitch and of the tangentially inwardly directed axis of the connecting opening 315a are the same, the spring turns will to a limited extent, transport cleaning liquid into the uppermost region of the spring chamber 315f lying opposite the connecting opening 315a.

We claim:

1. Apparatus for cleaning a liquid connection and securing a stroke and spring abutment for double seat pipeline switches with leakage control, comprising a pipeline switch housing, a pipeline switch drive mounted within said switch housing, two valve disks of different sizes, two concentrically mounted valve rods of different lengths, one of said valve rods being hollow, the one of longer length fitting within the other of shorter length, said inside valve rod being connected to said pipeline switch drive and the smaller of the two valve disks, said inside valve rod upon being lifted by said drive carrying along said valve disk of larger size, said valve disks in both the closed position and the open position enclosing between themselves a leakage cavity, one end of said hollow valve rod defining a pressing and guide part with a spring abutment and a connecting opening adapted to receive a cleaning fluid, a rod head forming a portion of the longer valve rod and defining a connecting opening, an upper spring abutment and an upper stop surface for said pressure and guide part, and a spring between said rod head and said pressing and guide part to bias them apart, said valve rod of longer length defining an axial bore with transverse holes communicating with said leakage cavity and said connecting opening in said valve head, said pressing and guide part communicating around said valve rod of longer length and through said leakage cavity with said axial bore and connecting opening of said valve head to provide a fluid passageway for said cleaning fluid through said apparatus.

2. Apparatus for cleaning a liquid connection and securing a stroke and spring abutment for double seat pipeline switches with leakage control, comprising a pipeline switch housing, a pipeline switch drive mounted within said switch housing, two valve disks of different sizes, two concentrically mounted valve rods of different lengths, one of said valve rods being hollow, the one of longer length fitting within the other of shorter length, said inside valve rod connected to said pipeline switch drive and the smaller of the two valve disks, said inside valve rod upon being lifted by said drive carrying along said valve disk of larger size, said valve disks in both the closed position and the open position enclosing between themselves a leakage cavity, one end of said hollow valve rod defining a pressing and guide part with a spring abutment and a connecting opening adapted to receive a cleaning fluid, a rod head forming a portion of the longer valve rod and defining an upper spring abutment and an upper stop surface for said pressure and guide part, and a spring between said rod head and said pressing and guide part to bias them apart, a first lifting device extending from the pressing and guide part and a first drive means independent of the pipeline switch drive to lift said hollow valve rod, the connecting opening of said pressing and guide part communicating around said valve rod of longer length to said leakage cavity to provide a fluid passageway for said cleaning fluid through said apparatus.

3. The apparatus of claim 2 including a second lifting device extending from the rod head and a second drive means independent of the pipeline switch drive to lift said valve rod of longer length.

4. The apparatus of claim 3 including a stroke limiter to limit the stroke of the valve rod of longer length.

5. The apparatus of claim 3 including a third drive means operable on said first and second lifting devices and independent of said pipeline switch drive to move said first and second lifting devices relatively toward each other.

6. Apparatus for cleaning a liquid connection and securing a stroke and spring abutment for double seat pipeline switches with leakage control, comprising a pipeline switch housing, a pipeline switch drive mounted within said switch housing, two valve disks of different sizes and two concentrically mounted valve rods of different lengths, one of said valve rods being hollow, the one of longer length fitting within the other of shorter length to define an annular clearance therebetween, said annular clearance communicating with the outside of said housing to form one terminus for said cleaning fluid, said inside valve rod connected to said pipeline switch drive and the smaller of the two valve disks, said inside valve rod upon being lifted by said drive carrying along said valve disk of larger size, said valve disks in both the closed position and the open position enlcosing between themselves a leakage cavity, said valve rod of longer length defining an axial bore with at least one transverse bore communicating with said leakage cavity, said annular clearance and the outside of said housing to form another terminus for said cleaning fluid and to provide a fluid passageway for said cleaning fluid through said apparatus, said termini being positioned on the same side of said valves.

* * * * *